(12) United States Patent
Pedrazzini

(10) Patent No.: US 11,965,824 B2
(45) Date of Patent: Apr. 23, 2024

(54) DEVICE AND PROCESS FOR SCREENING OF A BIOLOGICAL SAMPLE

(71) Applicant: Inpeco SA, Novazzano (CH)

(72) Inventor: Gianandrea Pedrazzini, Paradiso (CH)

(73) Assignee: Inpeco SA, Novazzano (CH)

( * ) Notice: Subject to any disclaimer, the term of this patent is extended or adjusted under 35 U.S.C. 154(b) by 344 days.

(21) Appl. No.: 17/609,884

(22) PCT Filed: May 7, 2020

(86) PCT No.: PCT/IB2020/054317
§ 371 (c)(1),
(2) Date: Nov. 9, 2021

(87) PCT Pub. No.: WO2020/229957
PCT Pub. Date: Nov. 19, 2020

(65) Prior Publication Data
US 2022/0214270 A1 Jul. 7, 2022

(30) Foreign Application Priority Data

May 10, 2019 (IT) .................. 102019000006738

(51) Int. Cl.
*G01N 21/31* (2006.01)
*G01N 21/25* (2006.01)
(Continued)

(52) U.S. Cl.
CPC ......... *G01N 21/314* (2013.01); *G01N 21/253* (2013.01); *G01N 35/00732* (2013.01);
(Continued)

(58) Field of Classification Search
CPC ............... G01N 21/314; G01N 21/253; G01N 35/00732; G01N 2021/3148;
(Continued)

(56) References Cited

FOREIGN PATENT DOCUMENTS

EP 3018482 A1 5/2016
EP 3165900 A1 5/2017
(Continued)

OTHER PUBLICATIONS

International Search Report and Written Opinion dated Aug. 28, 2020. 16 pages.

*Primary Examiner* — Md M Rahman
(74) *Attorney, Agent, or Firm* — RMCK Law Group PLC

(57) ABSTRACT

A device for screening of a biological sample in a container includes a lighting system having a radiation source, an analysis station having an optical detector and controller. The lighting system includes a filter holder device for selecting two radiations with different wavelengths. The analysis station includes a system for optical detection of the container before analysis of the sample, which includes a backlight panel and an illuminator for illuminating the container and to allow the optical detector to acquire an image of the container and send to the controller information based on the image. The controller controls a rotation system, set up in the analysis station, to position the container so that, in the analysis phase of the sample, the radiation irradiates the sample at an inspection window and a label is arranged on an opposite side with respect to that from which the radiation originates.

18 Claims, 10 Drawing Sheets

Figure 1:
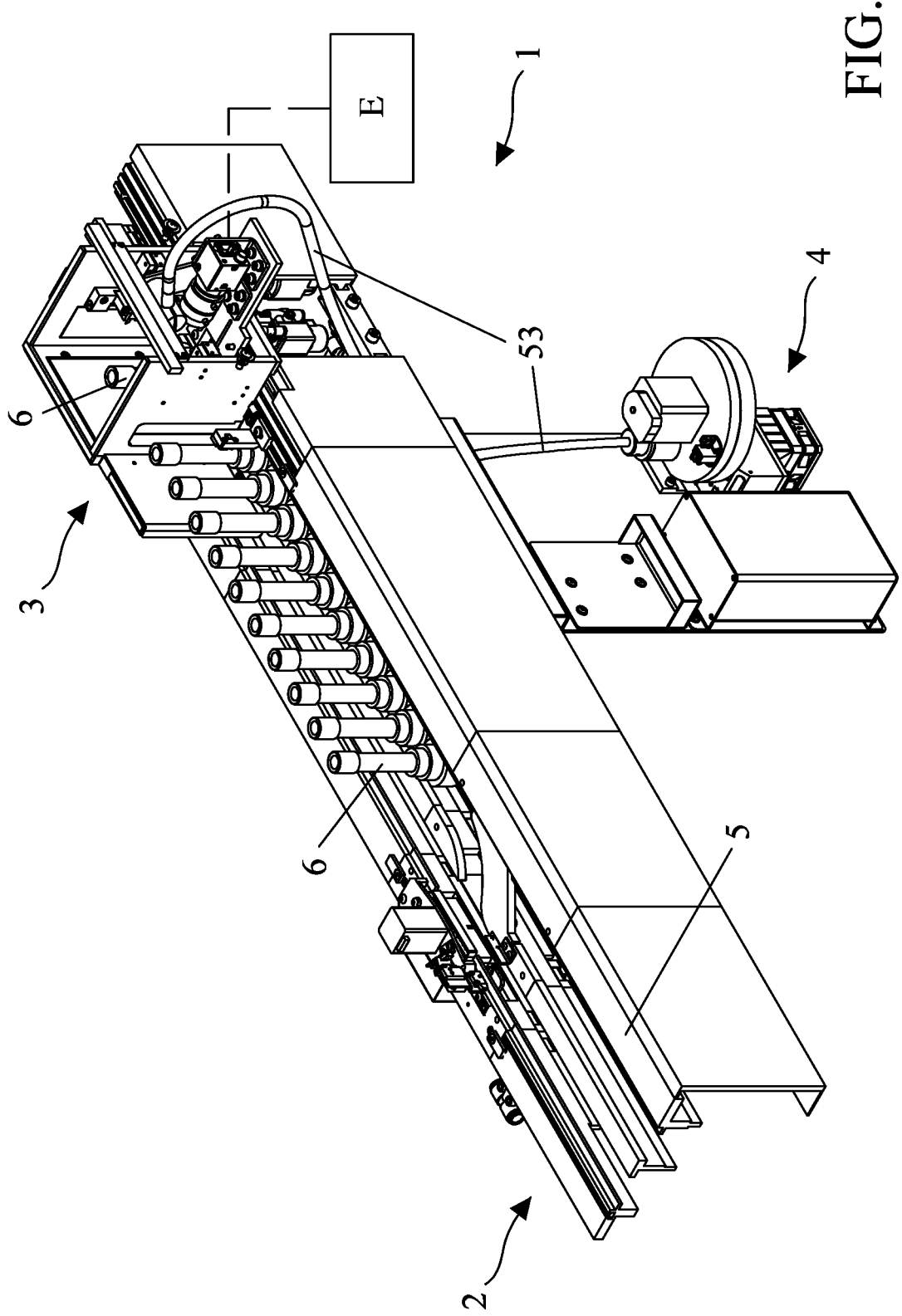

(51) Int. Cl.
    *G01N 35/00*         (2006.01)
    *G01N 35/04*         (2006.01)

(52) U.S. Cl.
    CPC ............... *G01N 2021/3148* (2013.01); *G01N 2035/0406* (2013.01); *G01N 2035/047* (2013.01); *G01N 2201/0469* (2013.01)

(58) Field of Classification Search
    CPC ..... G01N 2035/0406; G01N 2035/047; G01N 2201/0469; G01N 35/02; G01N 2021/3174
    USPC .......................................................... 356/39
    See application file for complete search history.

(56) References Cited

FOREIGN PATENT DOCUMENTS

| | | | |
|---|---:|---|---|
| EP | 3382376 | A1 | 10/2018 |
| JP | H0666808 | A | 3/1994 |
| WO | 2006040387 | A1 | 4/2006 |
| WO | 2011019576 | A1 | 2/2011 |
| WO | 2019027770 | A1 | 2/2019 |

DEVICE AND PROCESS FOR SCREENING OF A BIOLOGICAL SAMPLE

CROSS-REFERENCE TO RELATED APPLICATIONS

This application is a 371 National Stage of International Application No. PCT/IB2020/054317, filed May 7, 2020, which claims priority to Italian Patent Application No. 102019000006738 filed May 10, 2019. The disclosure of each of the above applications is incorporated herein by reference in its entirety.

FIELD OF THE INVENTION

The present invention relates to a device for the screening a biological sample contained in a container which is housed by a transport device and which has at least one label attached to one of its surfaces.

PRIOR ART

Nowadays, in clinical laboratories the need to ensure a high level of precision in the analysis of biological samples is increasing.

A biological sample is usually transported along an automated transport line comprising an automatic conveyor belt, in order to be sent to the appropriate analyzers.

Biological sample containers can be of different types. For the sake of simplicity the following discussion refers to a test tube, supported by a suitable transport device able to be transported along the belt.

The biological sample contained in the test tube, before being sent to the analyzers, must be centrifuged so that the separation between the liquid part (plasma or serum) and the corpuscular part takes place, such parts being eventually separated by the separation gel if originally present in the test tube.

Once the sample has arrived at an analyzer, generally the determination of the value of a specific analyte is carried out by means of spectrophotometric techniques, taking care to prepare in advance an aliquot of the content of a parent test tube, which is separated into one or more children cuvettes.

The analysis is then carried out on a cuvette, placed between a radiation source and a photodiode. The result of the analysis is obtained by reading the value of a signal received by the photodiode after the signal itself, emitted by the radiation source, has passed through the cuvette.

Problems arise because often a biological sample is already corrupt from the beginning by the presence of alterations of some specific parameters, which can affect the result of the analysis carried out by the analyzer.

In particular, among such alterations there may be "serum indices" such that, in the case the biological sample under examination is serum or plasma, it has an abnormal color. For example, three cases are known, corresponding with three distinct types of alteration:

Hemolysis (hereinafter "H"), whereby the serum has a bright red color due to the breakdown of red blood cells;

Icterus ("I"), whereby the serum has an intense yellow color due to an excess of bilirubin in the blood, especially visible in individuals subject to hepatic diseases;

Lipemia ("L"), whereby the serum has a milky white color due to the presence of lipids in the blood.

There are several known possibilities for detecting in advance the presence of such alterations.

A first solution is that in which the expert laboratory staff performs a visual analysis of the sample, looking for the respective characteristic colors of the serum in the three cases described above. In case of evident presence of one of the three factors, the altered biological sample is discarded, since its analysis would lead to unavoidably corrupt results. Of course, visual analysis involves a significant waste of time for laboratory staff, which delays the performance of other functions.

A second solution is to perform the screening of the alteration indices on the analyzer. Even this solution however, besides often requiring a significant use of reagents, involves a waste of time since, if the screening of the aforementioned indices gives a positive result, the results of other analyses performed by the analyzer would also be considered unreliable, that is the analyzer would have worked in vain. Furthermore, a screening performed by the analyzer involves a waste of time even if it has a positive result, due to the need to prepare an aliquot of the sample and to lift it from the transport device that houses it to take it to a station for the spectrophotometric analysis.

In known devices for the screening of a given parameter (or analyte) in a biological sample, it is usual to illuminate the sample with a known radiation and to detect the intensity of the radiation transmitted downstream of the sample and detected by a detection system, for example a photodiode.

Each type of detectable parameter shows, by virtue of its nature, a different response depending on the wavelength of the radiation that hits it. Each parameter therefore shows a characteristic curve, which indicates absorption peaks at specific wavelengths, experimentally determined. To detect the presence of a certain parameter it is then particularly suitable to irradiate the biological sample, contained in a test tube, with a radiation at the wavelength for which the characteristic curve of such parameter shows an absorption peak: in this way, in fact, a significant decay of the signal detected by the photodiode downstream of the test tube is a symptom of an absorption of the radiation by the sample, and therefore of the presence within the sample itself of the parameter under examination.

Figure 10:
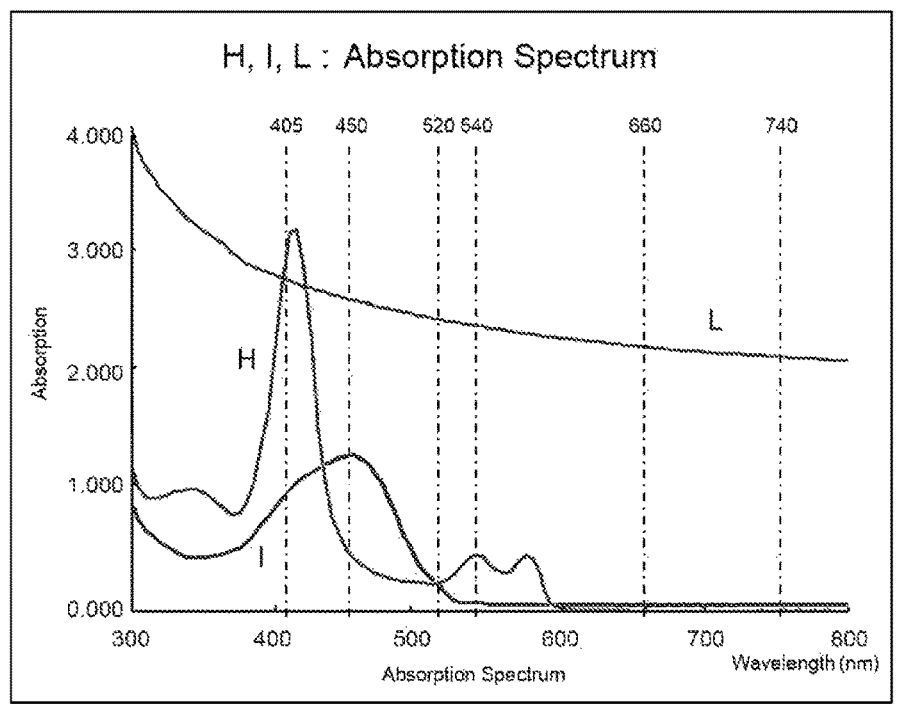

In order to proceed with an analysis for H, I or L in blood serum, absorption curves are observed, obtained experimentally for each one of the three indices, shown in the graph represented in FIG. 10 of the drawings annexed to this description.

Figure 11:
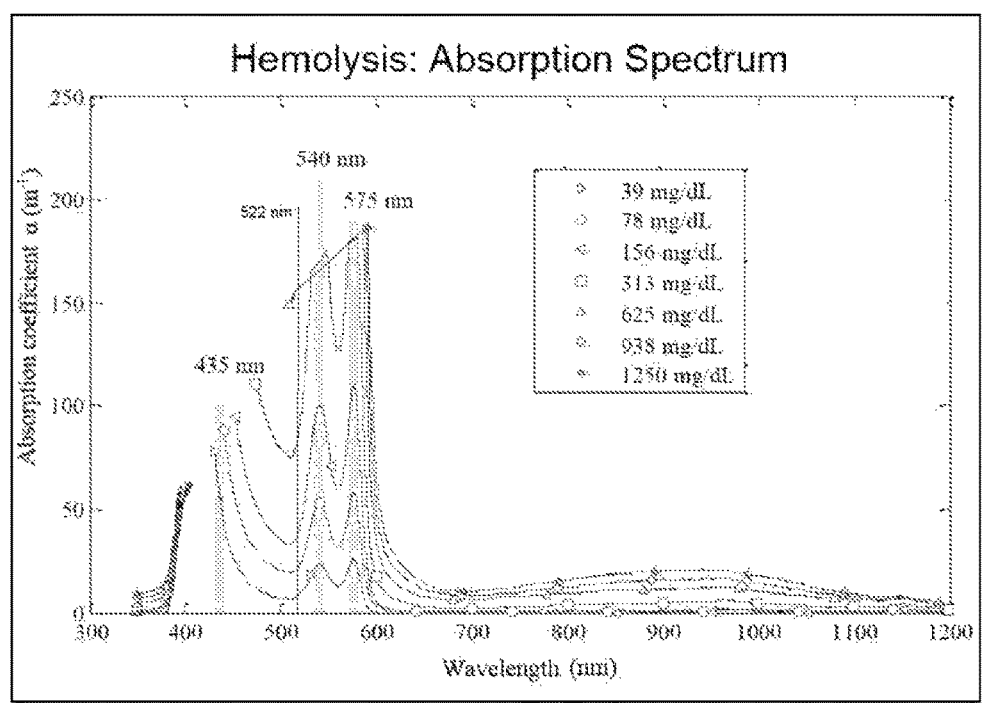

As already mentioned, it is useful to carry out the analysis of each of the indices based on a wavelength where the absorption shows a peak: in this way, the serum sample hit by a radiation with a wavelength corresponding to the peak shows an output signal characterized by a considerable attenuation, indicating the presence of the indicator of interest (H, I or L as appropriate). By way of example, the characteristic absorption spectrum for H is shown in FIG. 11.

However, if the analysis is performed by limiting it to the maximum absorption wavelength only, therefore having as unique result an intensity value of the transmitted light, the result itself is influenced by other parameters, such as the physical characteristics of the test tube. The result can indeed be affected, for example, by the size of the inspection window, that is of the typically rectangular area on the surface of the test tube which is actually hit by the radiation. A greater size of such area is linked with a greater amount of transmitted radiation. Similarly, other physical factors that can affect are the size (and eventually the number, if more than one is present) of the labels placed on the test tube, as well as the orientation with which they are applied. Furthermore, the material the test tube is made of may also influence the passage of radiation or not.

For these reasons, it is good to carry out the analysis by detecting not only the signal intensity at the wavelength of the absorption peak, but also at a reference wavelength. A ratio is then made between the two intensities, taking care that the values for the two different wavelengths have been obtained with the same aforementioned physical conditions of the test tube, so that they do not influence.

The signal is typically detected by a camera that acquires images of the sample and that works in the visible spectrum (from 440 nm to 700 nm). Therefore it is necessary to stay in this wavelength range.

A device that exploits the ratio between the transmitted intensities of a reference radiation and an absorption radiation, according to the mechanism described above, to screen a biological sample and, in particular, to detect the presence of serum indices, is for example described in document U.S. Pat. No. 7,688,448 B2. In this known solution, anyway, the transmission of the radiation through the biological sample can be influenced by any lack of homogeneity of the container surface or labels attached to it, with the risk of affecting the precision and accuracy of the detection. EP 3 018 482 A1 describes a detection device configured to detect color and quantity of a plurality of components which constitute a biological sample. The present invention starts from the desire to overcome some drawbacks of the prior art.

Object of the Invention

The object of the present invention is to provide a device for the screening of a biological sample of the type indicated at the beginning of the present description able to perform an accurate and precise analysis even in presence of labels or inhomogeneities on the surface of the container of the sample analyzed.

A further object of the present invention is to provide a device of the type above indicated which allows to automate the screening operations of a biological sample and to speed up the whole analysis procedure.

A further object of the present invention is to provide a device of the type above indicated which is simple and cheap to use.

SUMMARY OF THE INVENTION

In view of achieving one or more of the aforementioned objects, the invention relates to a device for the screening a biological sample having the characteristics indicated in claim 1.

In an embodiment, the filter holder device comprises at least two filters for selecting respectively an absorption radiation with a wavelength of 450 nm and a reference radiation with a wavelength of 660 nm, in order to detect the presence of lipemia in the biological sample.

In another embodiment, the filter holder device comprises at least two filters for selecting respectively an absorption radiation with a wavelength of 575 nm and a reference radiation with a wavelength of 660 nm, in order to detect the presence of hemolysis in the biological sample.

In another embodiment, the filter holder device comprises at least three filters for selecting respectively a first absorption radiation with a wavelength of 575 nm, a second absorption radiation with a wavelength of 520 nm and a reference radiation with a wavelength of 660 nm, in order to detect the presence of icterus in the biological sample.

In the preferred embodiment, the filter holder device comprises at least four filters for selecting three absorption radiations with wavelengths of respectively 450 nm, 520 nm and 575 nm, and a reference radiation with a wavelength of 660 nm, in order to detect the presence of hemolysis, icterus and lipemia in the biological sample by performing a single analysis.

Preferably, the filter holder device comprises at least one further black filter, in order to perform a quality control on the radiation emitted by the radiation source.

In the preferred embodiment, the filter holder device is a filter holder wheel.

According to a further characteristic of the preferred embodiment, the backlight panel and the radiation source are light-emitting diodes (LEDs).

Preferably, the automated transport line is able to transport the transport device housing the container downstream of the analysis station up to an analyzer.

In the preferred embodiment, the automated transport line comprises a station located downstream of the analysis station and upstream of the analyzer, able to remove containers marked as unacceptable following the analysis carried out in the analysis station.

The invention also relates to a process for the screening of a biological sample having the characteristics indicated in claim 11.

Preferably, the process is carried out using a filter holder device provided with filters with absorption and reference wavelengths already indicated above, for the purpose of detecting the presence of hemolysis, icterus or lipemia within a biological sample, by making separate analyses or by making a single analysis.

Preferably the process further comprises the transport, by means of the automated transport line, of the transport device housing the container up to an analyzer located downstream of the analysis station.

In the preferred embodiment, the process further comprises the removal of the samples marked as unacceptable following the analysis carried out in the analysis station. This removal is performed in a station located downstream of the analysis station and upstream of the analyzer.

DETAILED DESCRIPTION OF EMBODIMENTS OF THE INVENTION

Figure 2:
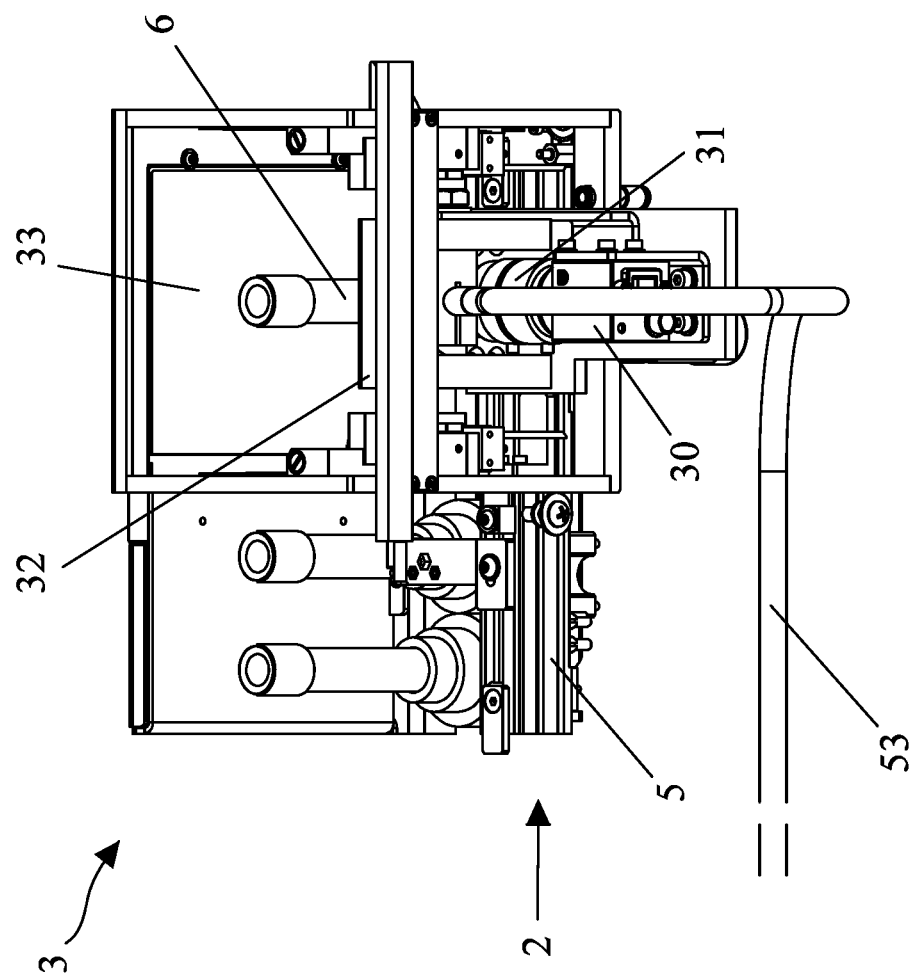
Figure 4:
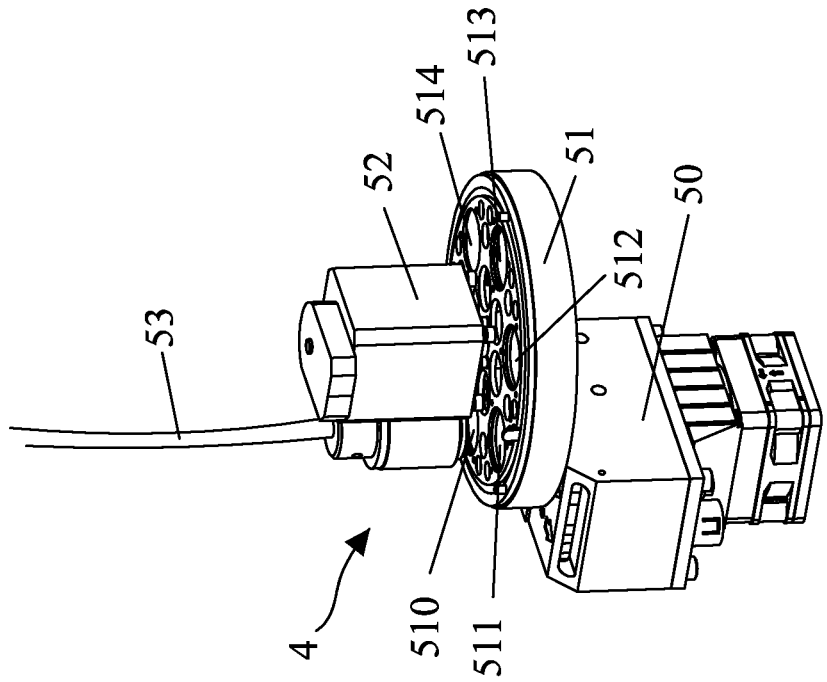
Figure 3:
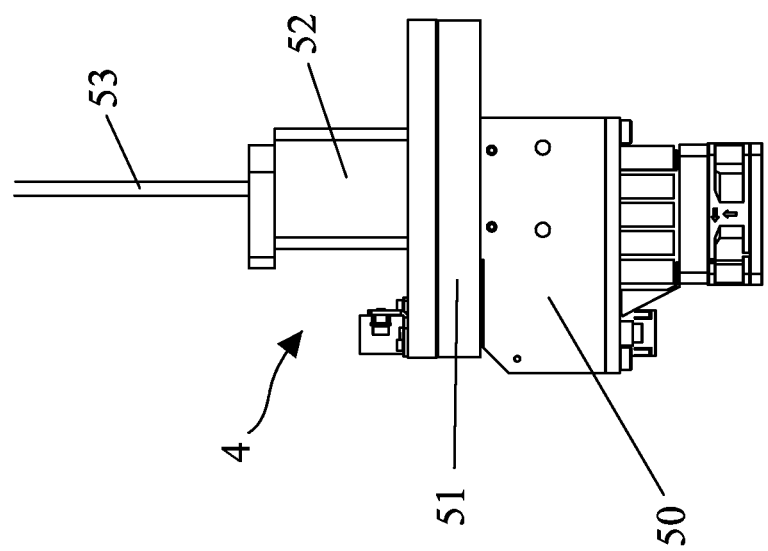
Figure 5:
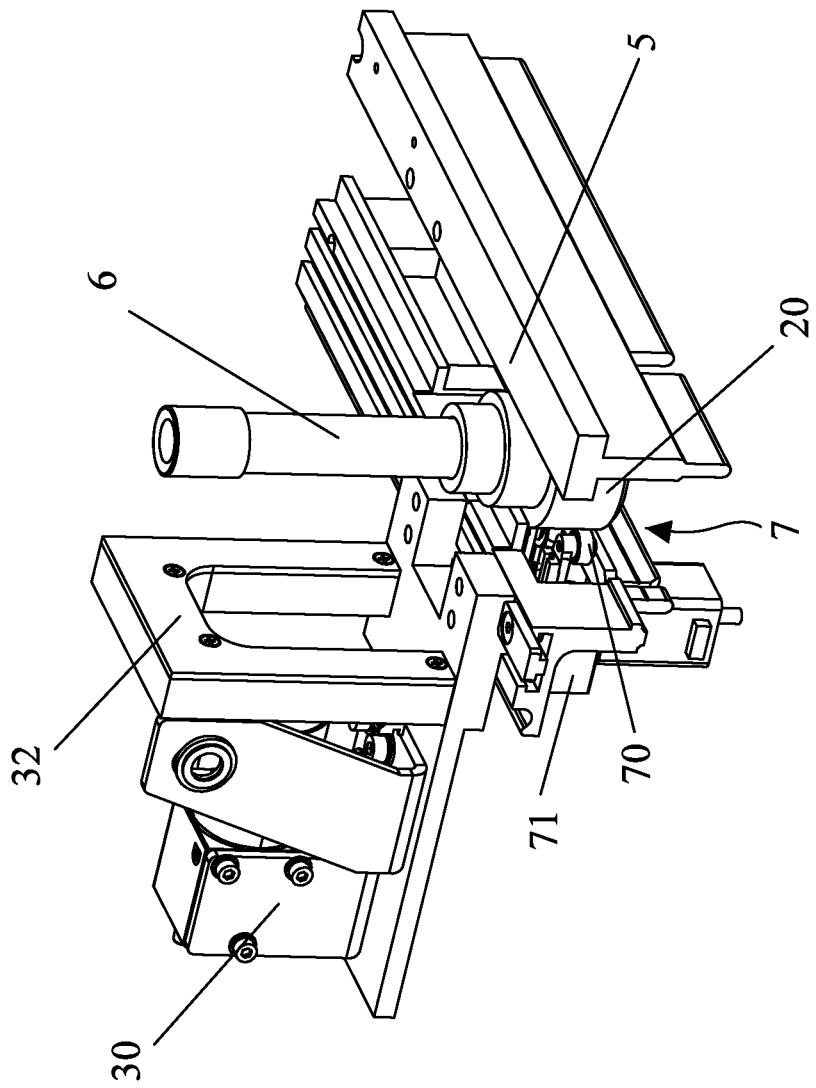
Figure 6:
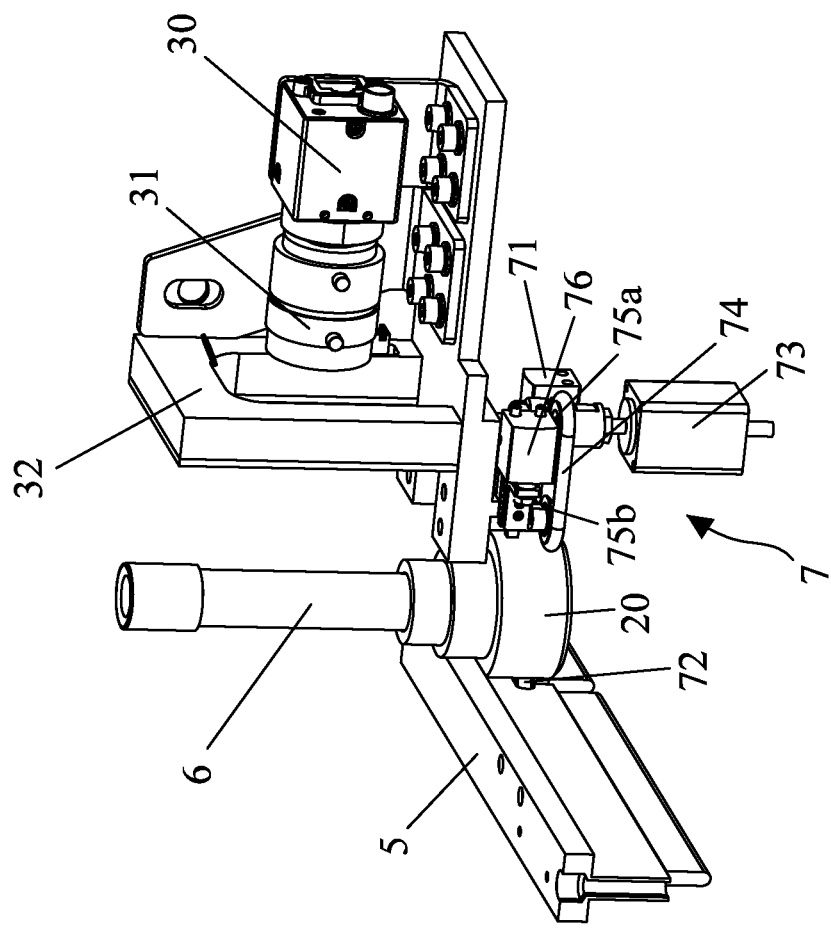
Figure 7:
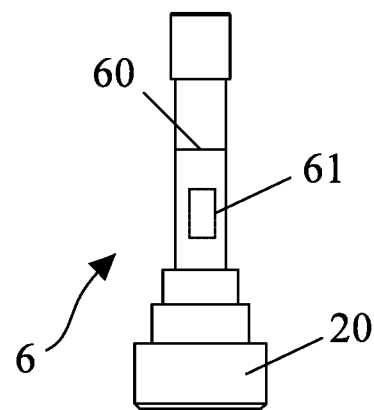
Figure 8:
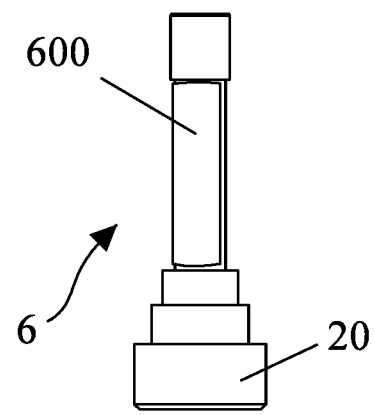
Figure 9:
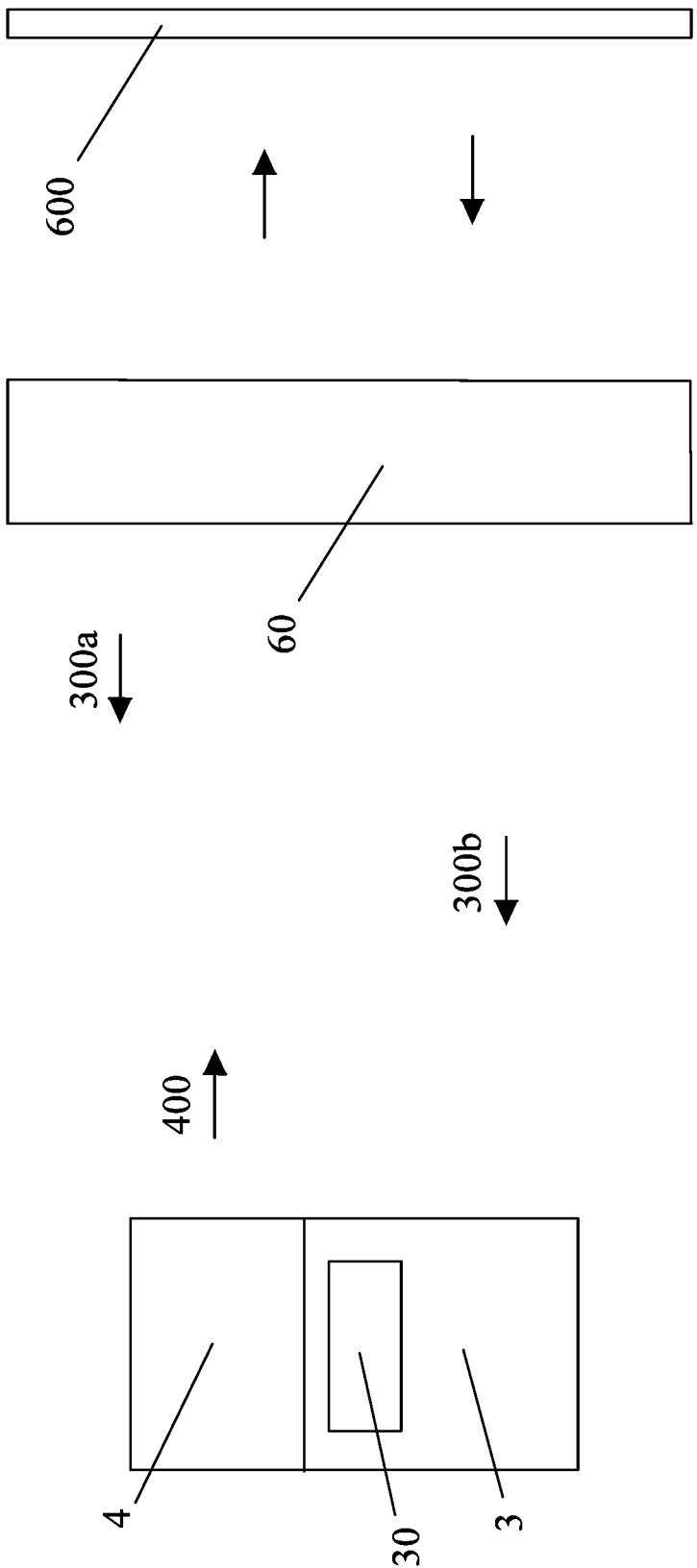
Figure 12:
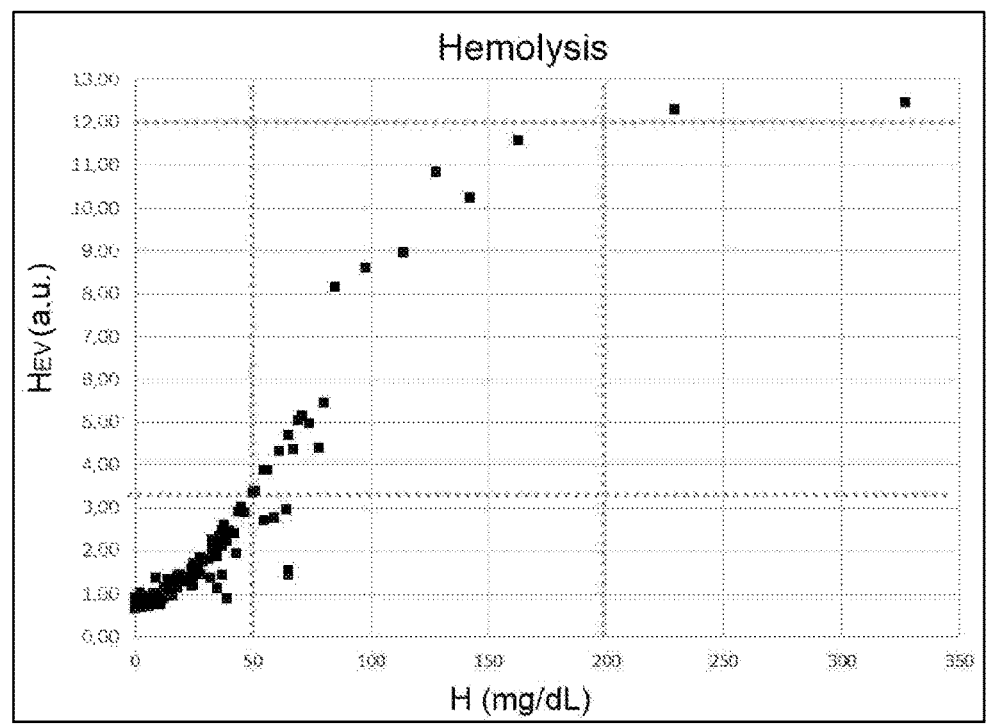
Figure 13:
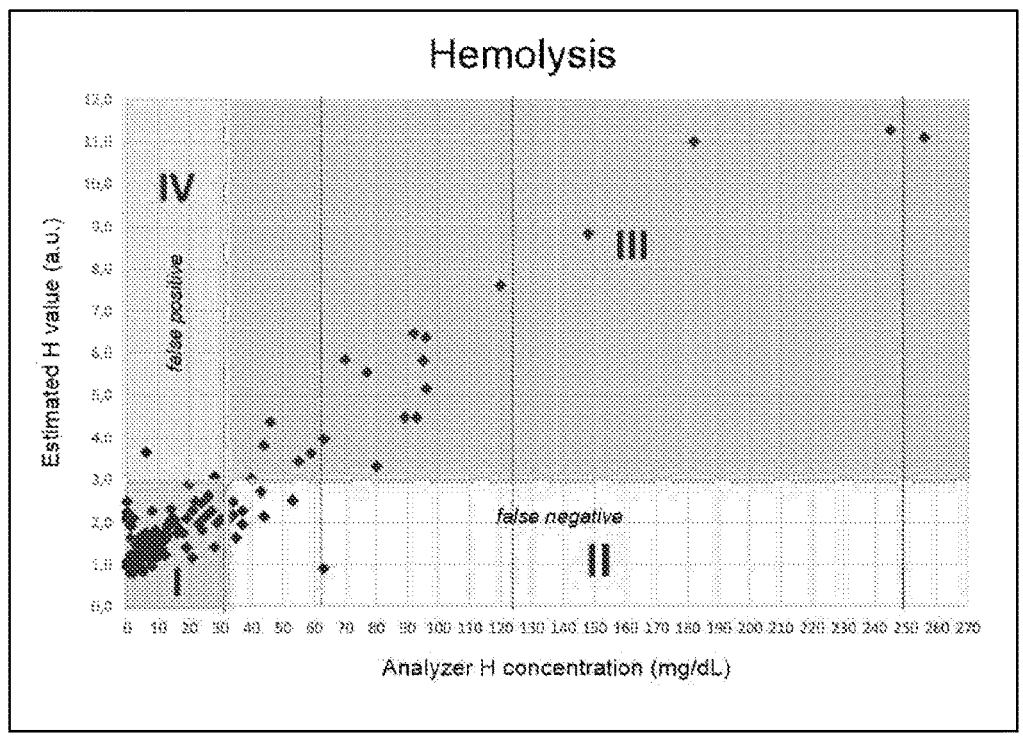
Figure 14:
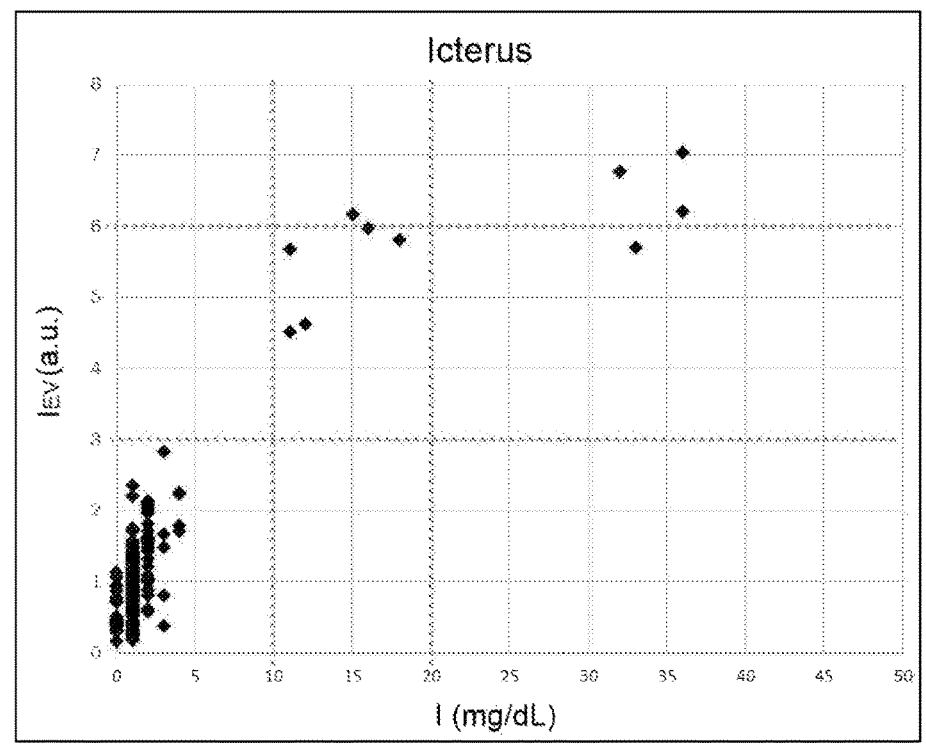
Figure 15:
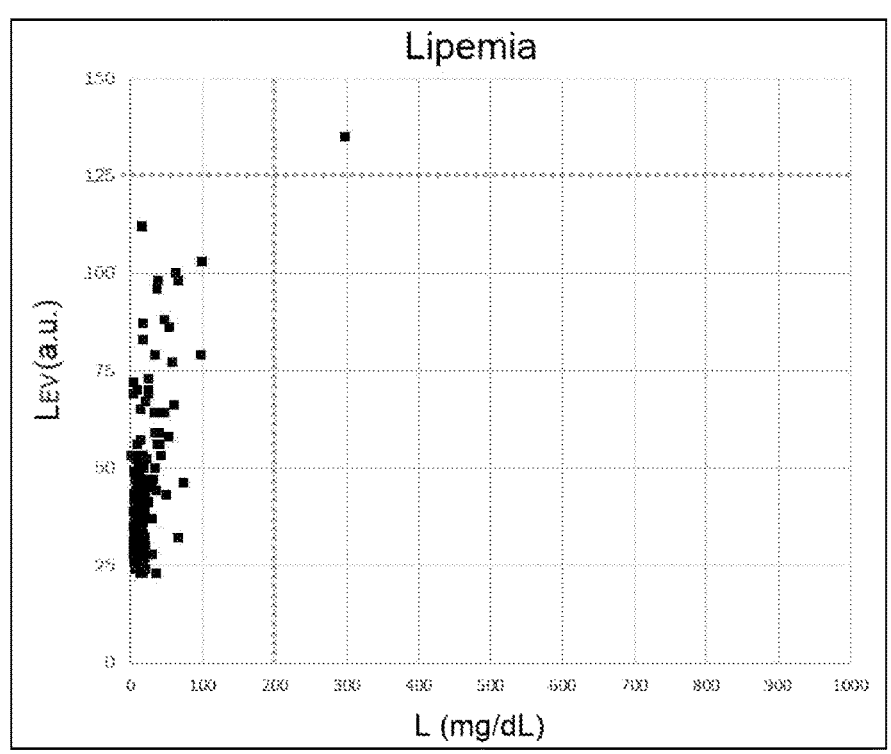

Further features and advantages of the invention will become apparent from the following description with reference to the annexed drawings, given purely by way of non-limiting example, in which:

FIG. 1 is a perspective view of the device for the screening of a biological sample according to the present invention, FIG. 2 is a raised side view of the analysis station of the device according to the present invention, FIG. 3 is a side view of the lighting system of the device according to the present invention, FIG. 4 is a perspective view of the lighting system of the device according to the present invention, FIG. 5 is a perspective view of the rotation system of the device according to the present invention, FIG. 6 is a perspective view of the rotation system of the device according to the present invention rotated by 180° with respect to the view of FIG. 5, FIG. 7 is a front view of the container of the biological sample with the sample volume and the inspection window in evidence, FIG. 8 is a front view of the container of the biological sample with the label in evidence, FIG. 9 is a diagram of the radiation path in the device according the present invention, FIG. 10 is a representation of the absorption curves obtained experimentally for H, I and L in blood serum, FIG. 11 is a representation of the characteristic absorption spectrum of H, FIG. 12 is a representation of a graph in which the parameters relating to H obtained using the device according to the present invention are related with the parameters detected by a reference analyzer, which expresses the results in mg/dl, FIG. 13 is a representation of a graph that highlights the correlation between the results relating to an analysis for H on blood serum samples performed using the device according to the present invention and the same analysis performed using a reference laboratory analyzer, FIG. 14 is a representation of a graph in which the parameters relating to I obtained using the device according to the present invention are related with the parameters detected by a reference analyzer, which expresses the results in mg/dl, and FIG. 15 is a representation of a graph in which the parameters relating to L obtained using the device according to the present invention are related with the parameters detected by a reference analyzer, which expresses the results in mg/dl.

In FIG. 1, the number 1 generally indicates a device for the screening a biological sample according to the present invention. In the embodiment shown, the device 1 comprises an analysis station 3 and a lighting system 4, which cooperate with each other to obtain the detection of a light signal. The device 1, furthermore, comprises an automated transport line 2 comprising an automatic conveyor 5 for advancing a biological sample contained in a container 6 through the analysis station 3.

In the preferred embodiment, the automated transport line 2 is able to transport the container 6 downstream of the analysis station, up to an analyzer (not shown).

With reference in particular to FIG. 2, in the embodiment shown the analysis station 3 comprises a camera 30 having a lens 31, a front illuminator 32 and a backlight panel 33, preferably LED. It must be understood that the camera 30 can be any other known optical detector, for example a video camera. The lens 31 is placed between the camera 30 and the front illuminator 32, laterally and orthogonally with respect to the path of the container 6 of biological sample along the automated transport line 2. The backlight panel 33 is placed facing the front illuminator 32. As shown in FIG. 1, the device 1 also comprises an electronic controller E, able to process signals emitted by the camera 30.

In the preferred embodiment the container 6 of biological sample is a test tube. However, this feature is not to be intended in a limiting sense, since the container 6 can be any known container of a biological sample, for example a cuvette or a centrifuge tube.

As visible in FIG. 1, in the preferred embodiment the lighting system 4 is located below the side covers of the automatic conveyor 5. Anyway, this feature is not to be intended in a limiting sense, since the lighting system 4 can be arranged in any position with respect to the automatic conveyor 5 such as not to interfere with the transport of the container 6 along the automated transport line 2.

As visible in FIGS. 3 and 4, in the embodiment shown the lighting system 4 comprises a radiation source 50, preferably LED, a filter holder device 51, comprising at least two filters for selecting at least two radiations with different wavelengths emitted by the radiation source 50, and an optical coupler 52. Preferably, the aforementioned elements are aligned vertically on each other in this order (FIG. 3), in an area hidden from view, with the radiation source 50 at the base.

The lighting system 4 and the analysis station 3 are connected by means of an optical fiber 53, having a first end connected with the lighting system 4 and a second end connected with the analysis station 3. In the preferred embodiment, the outlet of the optical fiber 53 in the analysis station 3 is located above the group consisting of the camera 30 and the lens 31 (FIG. 2). The optical fiber 53 is able to convey the radiation emitted by the radiation source 50 towards the container 6 located in the analysis station 3.

As shown in FIG. 4, in the preferred embodiment, the filter holder device 51 is a filter holder wheel 51 comprising 4 different filters 510, 511, 512 and 513, able to select respectively the following wavelengths: 450 nm, 660 nm, 575 nm and 520 nm. It is, furthermore, present a black filter 514. However, the scope of the present invention also covers embodiments in which the filter wheel comprises a number of filters different from that shown, and in which the filters are able to select different wavelengths from those listed above. Furthermore, the order of the filters to select the above mentioned wavelengths can be different from that shown in the figure.

As can be seen in particular in FIGS. 5 to 8, the container 6 of biological sample is housed by a transport device 20. In the embodiment shown, the transport device 20 consists of a series of coaxial cylinders arranged one above the other, whose diameters become smaller and smaller from the bottom to the top. However, this feature is not to be intended in a limiting sense, since the transport device 20 can be any other known transport device for a container 6 of biological sample.

As shown in FIGS. 5 and 6, in the preferred embodiment the analysis station 3 comprises a rotation system 7. The rotation system 7 comprises a first roller 70 and a second roller 72, each located at one of the two opposite sides of the automatic conveyor 5. When it is necessary to rotate the container 6 housed by the transport device 20, a first cylinder 71 operates the first roller 70, which comes out of its seat and protrudes into the space defined by the two opposite sides of the automatic conveyor 5. In this way, the transport device 20 is pushed by the first roller 70 against the second roller 72, thus remaining blocked. As can be seen in FIG. 6, the rotation system 7 further comprises a motor 73 and a belt 74, supported by two pulleys 75a and 75b. The second pulley 75b is pushed towards the transport device 20 thanks to the action of a second cylinder 76. In this way, the belt 74, kept in rotation by the motor 73, elastically stretches and presses against the transport device 20, causing its rotation.

As can be seen in FIG. 7, in the preferred embodiment the container 6 contains a volume 60 of sample, inside which an inspection window 61 is identified, which corresponds to the area which is irradiated by the radiation emitted by the radiation source 50. It is to be understood that the sample volume 60 and the inspection window 61 can be different from those shown, for example the container 6 may contain more or less sample volume 60, and the inspection window 61 can be located in a different point of the sample volume 60 and have a different shape from that shown.

As can be seen in FIG. 8, a label 600 is attached to the surface of the container 6. It is to be understood that also embodiments in which the shape and dimensions of the label 600 are different from those represented fall within the scope of the present invention. Furthermore, it is also possible that more than one label 600 is attached to the surface of the container 6.

The invention also relates to a process for the screening of a biological sample contained in a container 6 which is housed by a transport device 20 and which has at least one label 600 attached to a surface thereof, comprising the steps of:

providing an automated transport line 2 comprising an automatic conveyor 5 able to move forward the transport device 20 housing the container 6 through an analysis station 3, irradiating the container 6 in the analysis station 3 with a radiation emitted by a radiation source 50 and collecting through an optical detector the radiation after it has irradiated the container 6, providing an electronic controller E to process signals emitted by the optical detector to perform the screening of the biological sample contained in the container 6, filtering the radiation emitted by the radiation source 50 selecting a filter between at least two filters carried by a filter holder device located downstream of the radiation source 50, collecting the radiation reflected by a volume 60 of the sample in the container 6 and by the label 600 attached to the container 6 by means of the optical detector 30, in the form of a camera or video camera, when the label 600 is on the side of the container 6 opposite to that from which the radiation emitted by the optical fiber 53 originates, preliminarily to the analysis of the biological sample contained in the container 6 performing an optical detection of the container 6, making use of a backlight panel 33 and a front illuminator 32 placed one in front of the other and able to illuminate the container 6, and in order to allow the camera or video camera 30 to acquire, and possibly store, at least one image of the container 6, and to send to the electronic controller E an information on the basis of the acquired image, rotating the container 6 around a vertical axis, on the basis of the information received from the camera or video camera 30 to position the container 6 so that:

a) the label 600 attached to the surface of the container 6 is arranged on the opposite side with respect to that from which the radiation directed towards the container 6 originates, b) the emitted radiation irradiates the volume 60 of the sample at a predetermined inspection window 61.

It is to be understood that the aforementioned process can be carried out using any of the embodiments of the device 1 described above.

In the preferred embodiment, the process comprises the further step of detecting, by means of a first and a second sensor included in the camera or video camera 30, the intensity values of the components of reference radiation and absorption radiation which have not been absorbed by the biological sample, and of sending them to the electronic controller E. Preferably, the electronic controller E processes a ratio between the intensity value of absorption radiation not absorbed by the biological sample and the intensity value of reference radiation not absorbed by the biological sample, in any order.

In the preferred embodiment, the process comprises the further step of transporting, by means of the automated transport line 2, the container 6 housed by the transport device 20 downstream of the analysis station 3 up to an analyzer (not shown). Preferably, the containers 6 marked as unacceptable following the analysis carried out in the analysis station 3 are removed from a station (not shown) located downstream of the analysis station 3 and upstream of the analyzer.

In the following, a description will be given regarding the use of the preferred embodiment of the device 1 for the determination of serum indices of a biological sample and, more specifically, of the presence of hemolysis, icterus and lipemia (hereinafter: "HIL") in that sample. However, this implementation is not to be intended in a limiting sense, since the device 1 can also be used for other types of analyses and determinations to be carried out on biological samples, which provide for the irradiation of the sample with a light radiation and the following detection of the intensity of radiation not absorbed by the sample.

In the use of the embodiment shown in FIGS. 1 to 9, the container 6, containing the biological sample on which it is desired to perform the HIL screening, is transported towards the analysis station 3 of the device 1 by the automatic conveyor 5 of the automated transport line 2. Once arrived at the analysis station 3, the container 6, housed by a transport device 20, is blocked and the LED backlight panel 33 is switched on, allowing the camera 30 to identify the type of container 6. Thereafter, the backlight panel 33 is turned off and the front illuminator 32 is turned on. The rotation system 7 is then activated. The first cylinder 71 activates the first roller 70 of the rotation system 7, located at a side of the automatic conveyor 5. The first roller 70 comes out of its location and pushes the transport device 20 against the second roller 72, located at the opposite side of the automatic conveyor 5. At this point, the motor 73 drives the rotation of the belt 74 supported by the two pulleys 75a and 75b, the second of which is pushed towards the transport device 20 through the action of the second cylinder 76. In this way the belt 74, which has elastically stretched, presses against the transport device 20 and causes its rotation. In this way, even the container 6 is rotated around its vertical axis. During the rotation, the camera 30 acquires images of the container 6, thus identifying the sample volume 60 contained within it (ROI, Region of Interest of the sample) and detecting the presence of the label 600 attached to its surface. Later, the camera 30 sends an information to the electronic controller E according to the acquired images, on the basis of which the electronic controller E controls the rotation system 7 so that it rotates the container 6 so as to arrange the label 600 on the opposite side with respect to the camera 30. Then, the inspection window 61 of the sample is identified on the surface of the sample placed frontally with respect to the camera 30 in a portion totally free not only from the presence of labels 600, but also from writing, fingerprints or any other impurity, according to the "good laboratory practice". Once the container 6 is correctly positioned, the rotation system 7 is blocked and the LED radiation source 50 of the lighting system 4 is switched on, emitting white light, which is filtered through one of the filters 510, 511, 512, 513 of the filter holder wheel 51 and, through the optical coupler 52, reaches the optical fiber 53. The four filters 510, 511, 512 and 513 are applied one at a time to the radiation emitted by the LED image source 50, thus allowing to obtain radiations with four different wavelengths, respectively equal to 450 nm, 520 nm, 575 nm and 660 nm, with which to irradiate the biological sample through the optical fiber 53. The filter holder wheel 51 includes an additional black filter 514, used only for a quality control of the LED light emitted by the second illuminator 50. The path of the radiation, once directed towards the sample 60, is outlined in FIG. 9. The component 300a of the radiation 400 emitted by the lighting system 4 is reflected by the sample volume 60 and returns to the camera 30 of the analysis station 3. The reflection due to the material of which the container 6 is made is considered negligible. The radiation that is not reflected or absorbed by the sample volume 60 reaches the surface of the container 6 opposite to the second end of the optical fiber 53, where it undergoes a reflection by the label 600, generating a second component 300b of the radiation 400 which, after having again passed through the sample volume 60, reaches the camera 30. The camera 30 detects, therefore, a radiation composed of the two components 300a and 300b, and can acquire an image of the sample volume 60 at the same time as the illumination thereof.

Since the analysis is carried out by selecting in sequence 4 different wavelengths (450 nm, 520 nm, 575 nm and 660 nm) from the radiation emitted by the image source 50 by means of the filter holder wheel 51, the camera 30 acquires a series of images related to these wavelengths. The camera 30 is color, i.e. it is equipped with sensors, each of which sensitive to an area of the visible spectrum corresponding to the four wavelengths used. Each lighting corresponds to a specific color signal. More specifically, 450 nm correspond to a blue signal, 520 nm to a green signal, 570 nm to a yellowish signal and 660 nm to a red signal. In this way it is possible to distinguish the response of the camera 30 on each of the color channels. The camera 30 provides a result, for each of the acquired images, expressed in terms of grey levels of the image, from "255" (very intense signal tending to white) up to "0" (dark signal, tending to black). A grey level response is therefore obtained for each of the above mentioned colored channels; each grey level is given by the sum of the two signal components 300a, reflected by the sample volume 60, and 300b, reflected by the label 600. The ratio between the grey level values, corresponding to the respective light intensities, for two of the wavelengths of interest, gives a non-dimensional number, shown in ordinate in the graph represented in FIG. 12, referring to an hemolysis analysis. The symbols in the graph represent each individual serum sample examined. For each of them, the ordinate value represents the ratio between the intensity (detected by the camera 30) of the signal at the reference wavelength (660 nm) and the intensity at the absorption wavelength (575 nm). The higher the ordinate value is, the greater is the absorption of the light signal at the chosen absorption wavelength, indicating that the sample is hemolytic. The abscissa value represents the actual hemolysis value (in mg/dL) detected on the same samples by a laboratory analyzer taken as reference. It is to be understood that, for the purpose of assessing whether or not the biological sample is hemolytic, the ratio between the detected intensities of the reference I(ref) and absorption I(abs) radiations can be carried out in any order, that is both I(abs)/I(ref) and I(ref)/I(abs). In the first case, the smaller the value, the more the sample is hemolytic. In the second case, the higher the value, the more the sample is hemolytic.

In FIG. 13 it is shown again the graph represented in FIG. 12 with four highlighted areas, which allow to perform a comparison between the values detected by the device 1 object of the invention and those detected by the reference laboratory analyzer. FIG. 13 shows an analysis in classes of a kind in use in many laboratories, i.e. with classes on hemolysis that establish a class 0 for the range from 0 to 50 mg/dl, a class 1 for the range between 50 and 200 mg/dl, and a class 2 for the range above 200 mg/dl.

As can be seen, there are few cases in which the samples have been underestimated ("false negatives", quarter II), that is samples classified by the device 1 as "little" hemolytic that have a high real H value, and there are just as few cases in which they have been overestimated ("false positives", quarter IV), that is samples classified by the device 1 as "very" hemolytic which have a low real H value. The measurements in quarters I and III (as can be seen, definitely the majority) are instead the correct ones, in which the sample detected by the device as "hemolytic" (quarter III) or "non-hemolytic" (quarter I) is actually such. This also depends, of course, on thresholds that are established to distinguish a sample as "little hemolytic", "hemolytic" and "very hemolytic". These thresholds can be arbitrary and vary for each laboratory. In this way there is also the possibility of discriminating the samples by "classes", dividing them according to different intervals to establish their level of H, on the basis of the same division at intervals that often also the analyzers apply. By analyzing the grey dashes of the graph represented in FIG. 12, it is possible to arrive to an estimate and assume that the samples with an ordinate value lower than 3,2 have an H value between 0 and 50, those with a value between 3,2 and 12 have an H value between 50 and 200 and those with a value greater than 12 have an H value greater than 200.

The scope is substantially identical for the use of device 1 in an analysis of different serum indices of the biological sample, for example an analysis of icterus levels (FIG. 14) or lipemia (FIG. 15).

The samples that are identified as unacceptable following the screening performed in the analysis station 3 are removed from the automated transport line 2 by means of a system arranged for this purpose (not shown), located downstream of the analysis station 3 and upstream of the analyzer, in order to prevent the performance of analyses on samples determined as unsuitable.

As it is clear from the above description, the device according to the invention is characterized by greater accuracy and precision of analysis than the currently known devices for the performance of the screening of a biological sample. The positioning of the biological sample container, prior to the screening, in order to exploit the label attached on its surface to reflect the radiation component not absorbed by the sample towards the camera or video camera, advantageously placed on the same side of the analysis source with respect to the container, allows to limit the error that arises when working in transmission and the radiation must pass through the label before being detected by the camera.

Studies and experiences carried out by the Applicant have shown that the use of a filter holder device that enables to select multiple different filters and, consequently, as many wavelengths during the same analysis allows to perform, in a single screening, the detection of several different parameters, significantly speeding up the procedures compared to the currently known devices.

Of course, without prejudice to the principle of the invention, the construction details and the embodiments may vary widely with respect to what is described and illustrated purely by way of example, without thereby departing from the scope of protection of the present invention, as defined in the annexed claims.

The invention claimed is:

1. A device for screening of a biological sample contained in a container which is housed by a transport device and which has at least one label attached to a surface thereof, said device comprising:
   a lighting system comprising a radiation source,
   an analysis station in which said container is irradiated by a radiation emitted by said radiation source, and comprising an optical detector for collecting said radiation after it has irradiated the container,
   an optical fiber connected at a first end with said lighting system and at a second end with said analysis station, for conveying the radiation emitted by said radiation source towards said container in said analysis station,
   an automated transport line comprising an automatic conveyor configured to move forward said transport device housing said container through said analysis station, and
   an electronic controller, configured to process signals emitted by said optical detector,
   wherein said lighting system comprises a filter holder device located downstream of said radiation source, comprising at least two filters for selecting at least two radiations with different wavelengths, including a reference radiation and an absorption radiation,
   wherein said optical detector is a camera or video camera, configured to collect radiation reflected by a volume of the sample in the container and by said at least one label attached to the container, when the at least one label is on a side of the container opposite to that from which the radiation emitted by said radiation source originates,
   said camera or video camera being provided with at least a first sensor sensitive to said reference radiation and with at least a second sensor sensitive to said absorption radiation, said first sensor and said second sensor being configured to detect, respectively, intensity values of components of said reference radiation and of said absorption radiation which are not absorbed by said biological sample and to send said intensity values to said electronic controller,
   said electronic controller being configured and programmed to process a ratio between the intensity value of the components of absorption radiation not absorbed by said biological sample and the intensity value of the components of reference radiation not absorbed by said biological sample, in any order,
   wherein said analysis station further comprises an optical detection system of the container for analysis of the biological sample contained therein,
   wherein said optical detection system of the container includes a backlight panel and a front illuminator placed one in front of the other and configured to illuminate said container, and to allow said camera or video camera (30) to acquire, at least one image of said container, and to send to said electronic controller information based on said at least one acquired image,
   said analysis station comprising a rotation system for rotating said container around a vertical axis of its own,
   said electronic controller being configured and programmed to control said rotation system on a basis of information received from said camera or video camera to position said container so that, during a following analysis phase of the biological sample contained in the container:
   a) said at least one label attached to a surface of said container is arranged on the opposite side with respect to that from which the radiation emitted by the optical fiber originates, and
   b) the radiation emitted by said optical fiber irradiates said volume of the sample at a predetermined inspection window.

2. The device according to claim 1, wherein said filter holder device comprises at least two filters for selecting respectively an absorption radiation with a wavelength of 450 nm and a reference radiation with a wavelength of 660 nm, in order to detect a presence of lipemia in said biological sample.

3. The device according to claim 1, wherein said filter holder device comprises at least two filters for selecting respectively an absorption radiation with a wavelength of 575 nm and a reference radiation with a wavelength of 660 nm, in order to detect a presence of hemolysis in said biological sample.

4. The device according to claim 3, wherein said filter holder device comprises at least one further filter for selecting an absorption radiation with a wavelength of 520 nm, in order to detect a presence of icterus in said biological sample.

5. The device according to claim 4, wherein said filter holder device comprises at least one additional filter for selecting an absorption radiation with a wavelength of 450 nm, in order to detect a presence of hemolysis, icterus and lipemia in said biological sample by performing a single analysis.

6. The device according to claim 5, wherein said filter holder device comprises at least one black filter, in order to perform a quality control on the radiation emitted by said radiation source.

7. The device according to claim 1, wherein said filter holder device is a filter holder wheel.

8. The device according to claim 1, wherein said backlight panel and said radiation source are light-emitting diodes (LEDs).

9. The device according to claim 1, wherein said automated transport line is configured to transport said transport device housing said container downstream of said analysis station up to an analyzer.

10. The device according to claim 9, wherein said automated transport line comprises a station located downstream of said analysis station and upstream of said analyzer, said station being configured to remove containers marked as unacceptable following the analysis carried out in said analysis station.

11. A process for screening of a biological sample contained in a container which is housed by a transport device and which has at least one label attached to a surface thereof, said process comprising the steps of:
   providing an automated transport line comprising an automatic conveyor configured to move forward said transport device housing said container through an analysis station,
   irradiating said container n said analysis station with a radiation emitted by a radiation source and collecting through an optical detector said radiation after it has irradiated the container,
   providing an electronic controller to process signals emitted by said optical detector to perform the screening of the biological sample contained in the container, selecting at least two radiations with different wavelengths, including a reference radiation and an absorption radiation, filtering the radiation emitted by said radiation source by means of at least two filters carried by a filter holder device located downstream of said radiation source, by means of said optical detector of the analysis station in the form of a camera or video camera, collect radiation reflected by a volume of the sample in the container and by said at least one label attached to the container, when the at least one label is on a side of the container opposite to that from which the radiation emitted by said radiation source originates, detect and send to said electronic controller intensity values of components of said reference radiation and of said absorption radiation which have not been absorbed by said biological sample, respectively by means of a first sensor and a second sensor included in said camera or video camera, process by means of said electronic controller a ratio between the intensity value of the components of absorption radiation not absorbed by said biological sample and the intensity value of the components of reference radiation not absorbed by said biological sample, in any order, preliminarily to an analysis of the biological sample contained in the container, perform an optical detection of the container, making use of a backlight panel and a front illuminator placed one in front of the other and configured to illuminate said container, in order to allow said camera or video camera to acquire at least one image of said container, and send to said electronic controller information on the basis of said at least one acquired image, rotate said container around a vertical axis, on a basis of the information received from said camera or video camera to position said container so that, during an analysis phase of the biological sample contained in the container:

a) said at least one label attached to the surface of said container is arranged on the opposite side with respect to that from which the radiation directed towards the container originates, and b) the emitted radiation irradiates said volume of the sample at a predetermined inspection window.

12. The process according to claim 11, wherein said filter holder device comprises at least two filters for selecting respectively an absorption radiation with a wavelength of 450 nm and a reference radiation with a wavelength of 660 nm, in order to detect a presence of lipemia in said biological sample.

13. The process according to claim 11, wherein said filter holder device comprises at least two filters for selecting respectively an absorption radiation with a wavelength of 575 nm and a reference radiation with a wavelength of 660 nm, in order to detect a presence of hemolysis in said biological sample.

14. The process according to claim 13, wherein said filter holder device comprises at least one further filter for selecting an absorption radiation with a wavelength of 520 nm, in order to detect a presence of icterus in said biological sample.

15. The process according to claim 14, wherein said filter holder device comprises at least one additional filter for selecting an absorption radiation with a wavelength of 450 nm, in order to detect a presence of hemolysis, icterus and lipemia in said biological sample by performing a single analysis.

16. The process according to claim 15, wherein said filter holder device comprises at least one further black filter, in order to perform a quality control on the radiation emitted by said radiation source.

17. The process according to claim 11, wherein said automated transport line is configured to transport said transport device housing said container downstream of said analysis station up to an analyzer.

18. The process according to claim 17, wherein containers marked as unacceptable following the analysis carried out in said analysis station are removed from a station located downstream of said analysis station and upstream of said analyzer, said station being included in said automated transport line.

* * * * *